Jan. 21, 1958 L. I. COHN 2,820,643
HAND TRUCK AND DOLLY
Filed July 25, 1955 5 Sheets-Sheet 3
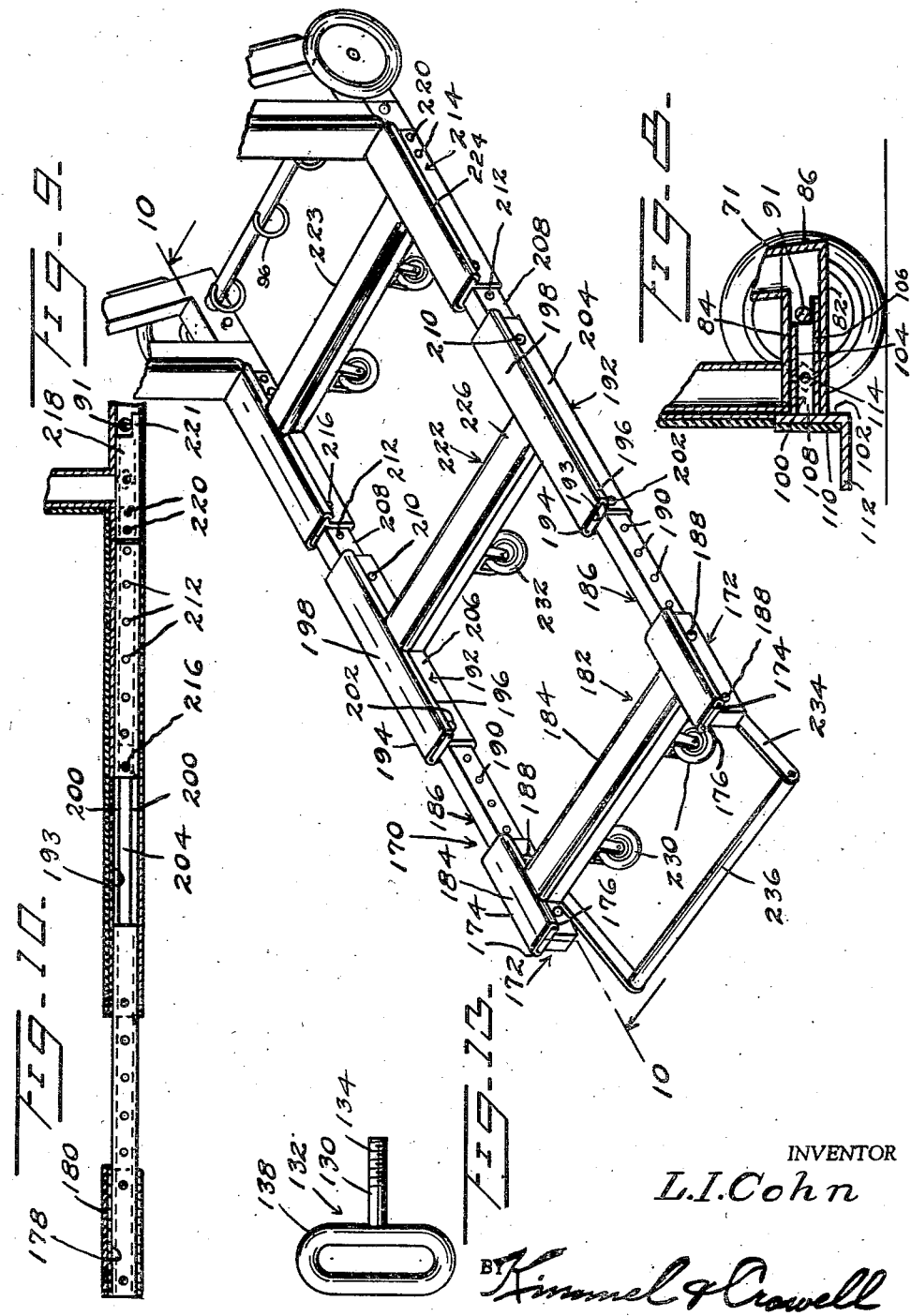
INVENTOR
L.I.Cohn
BY Kimmel & Crowell
ATTORNEYS

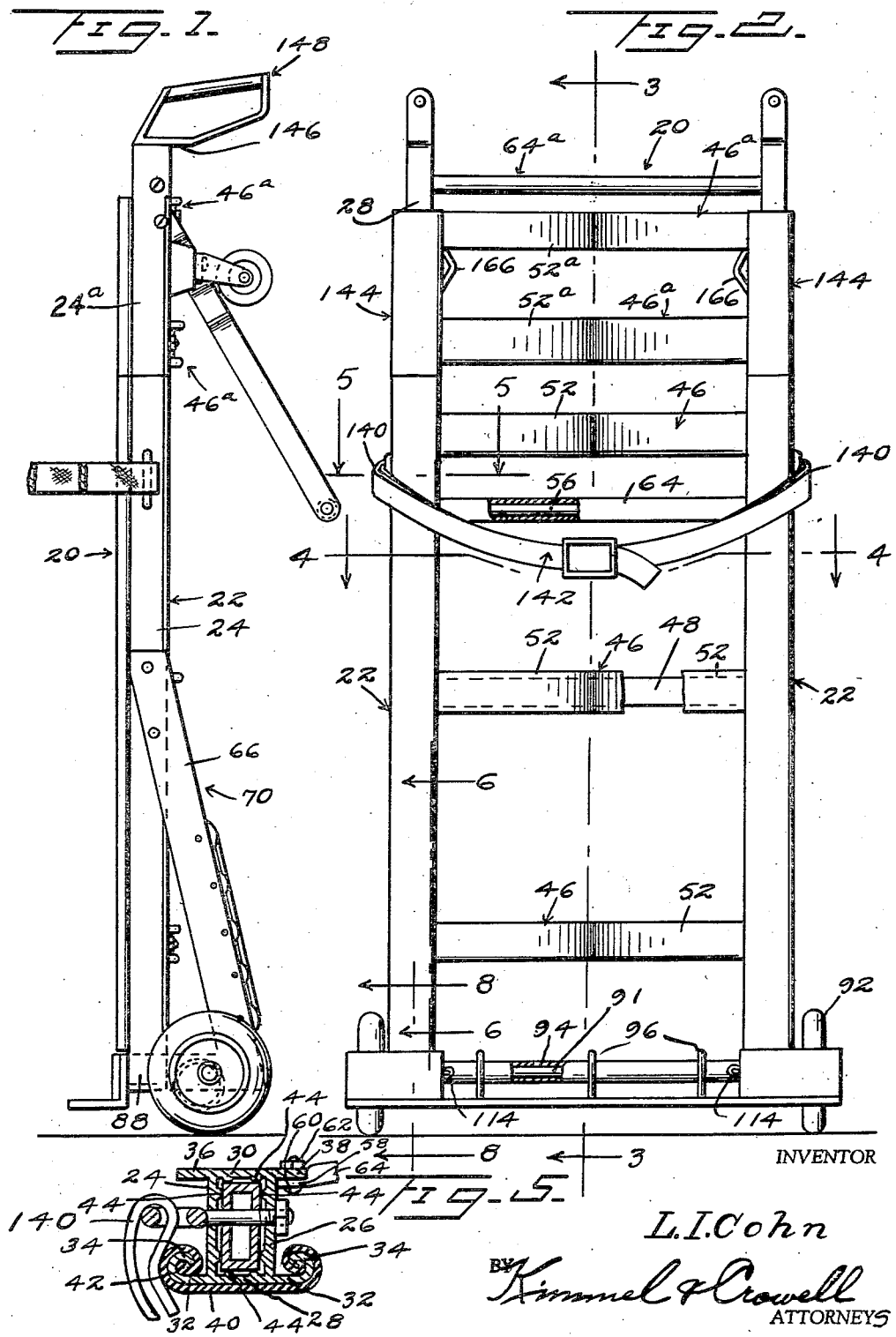

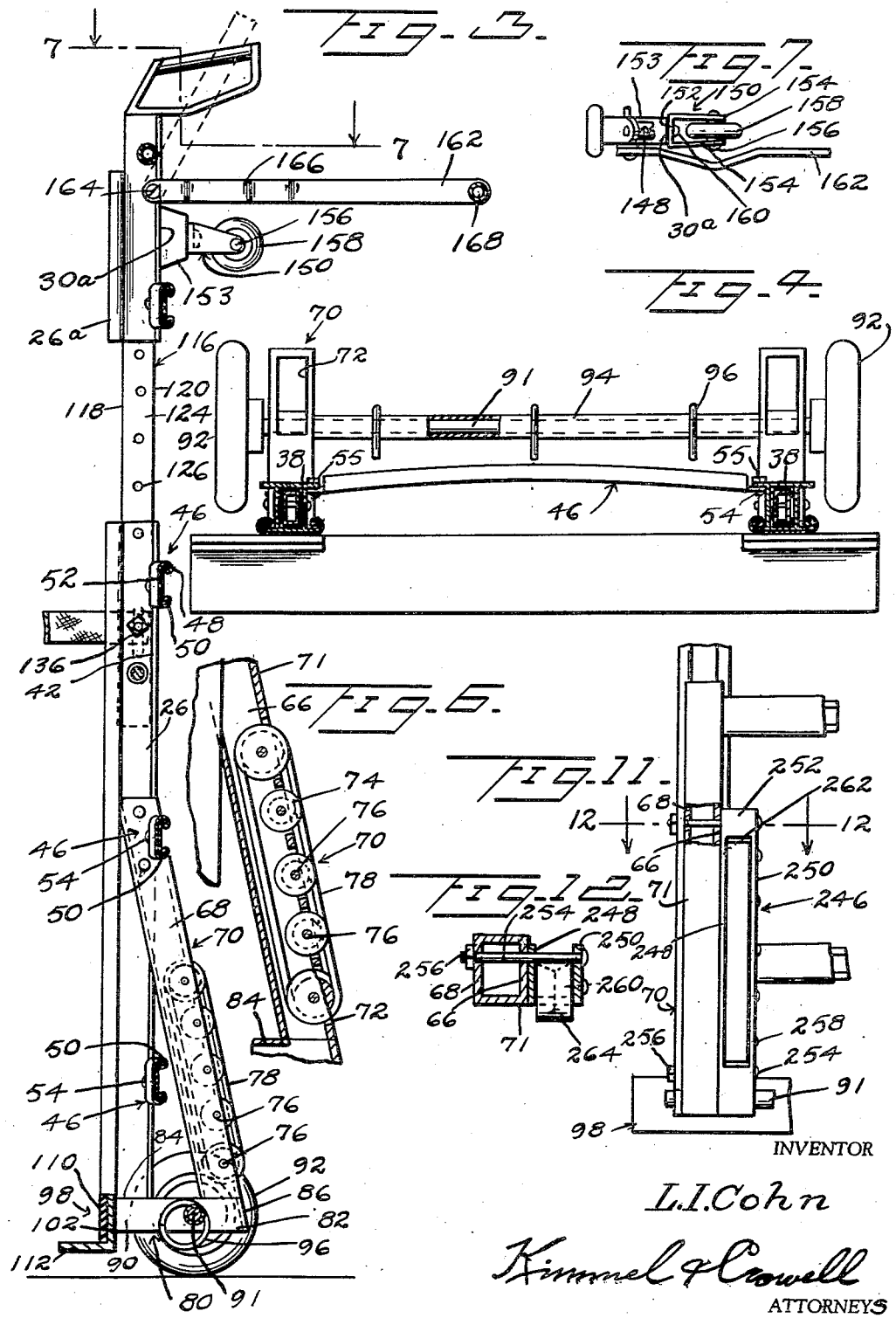

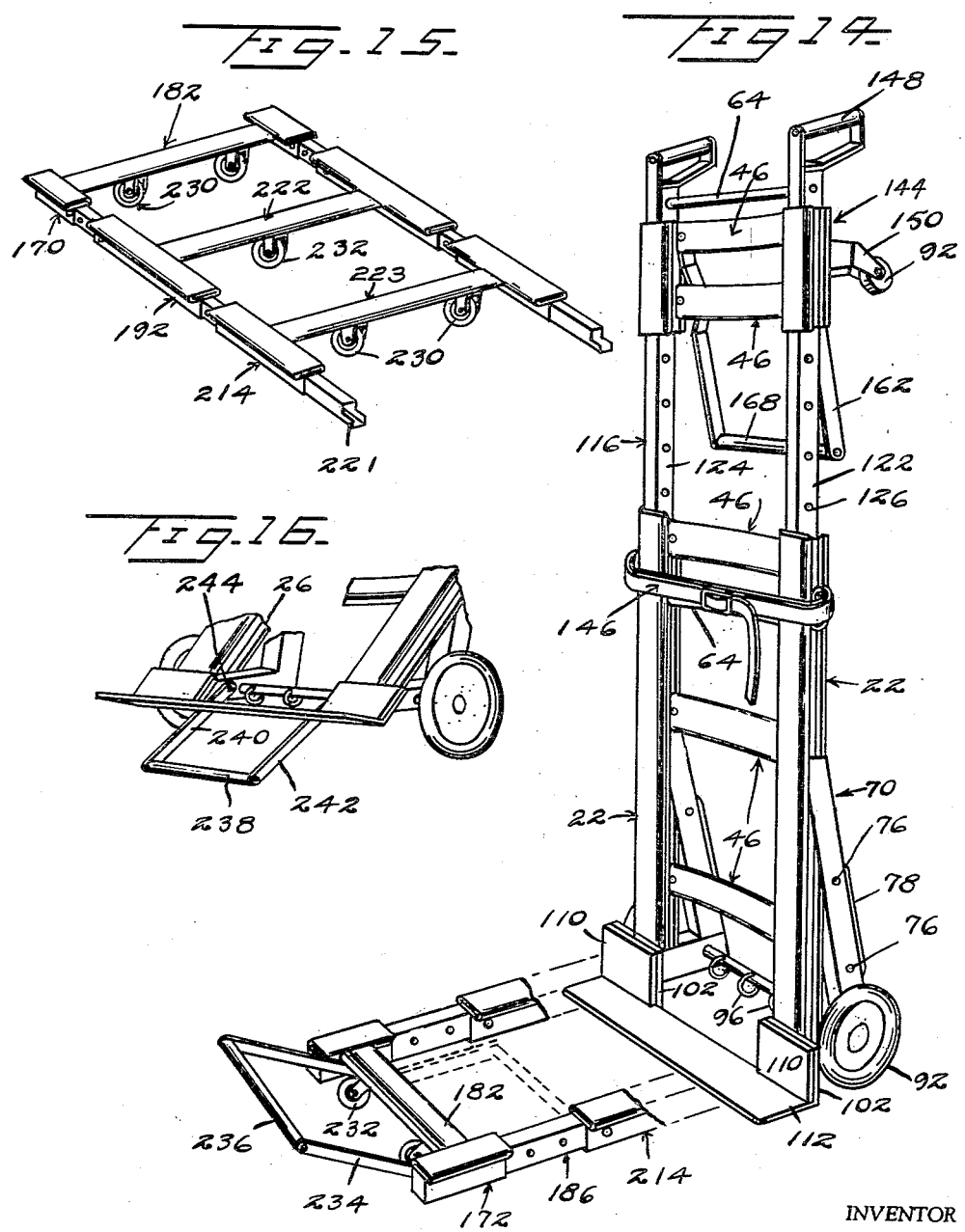

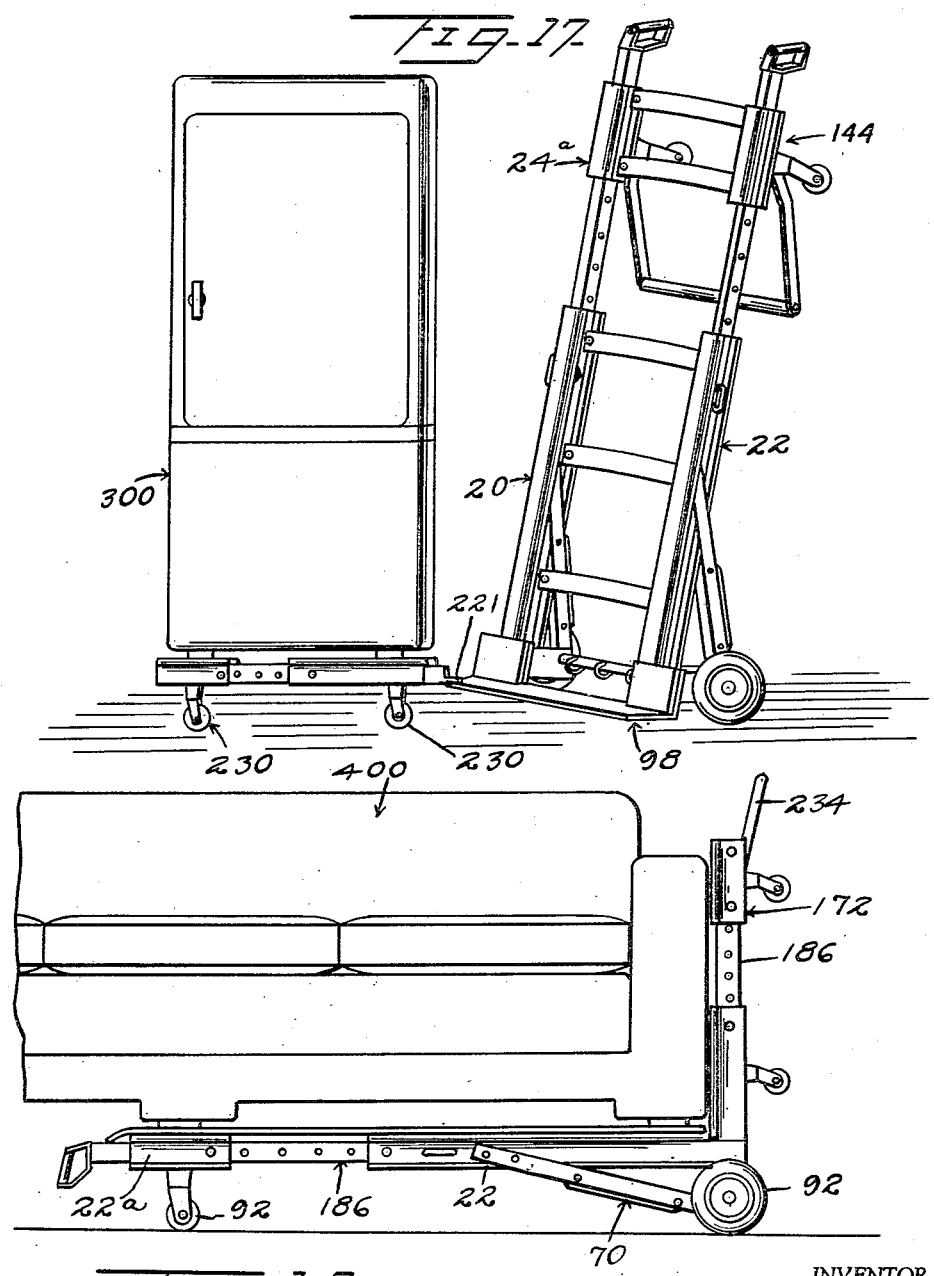

United States Patent Office 2,820,643
Patented Jan. 21, 1958

2,820,643

HAND TRUCK AND DOLLY

Louis Israel Cohn, Philadelphia, Pa.

Application July 25, 1955, Serial No. 524,244

4 Claims. (Cl. 280—34)

The objects of this invention, as hereinafter more fully set forth, are generally to provide a hand truck of a unique construction having features of adaptability not heretofore known in connection with an article of manufacture of this type, both as to ease and convenience of use, and as to versatility and safety to the operator and to the articles handled thereon.

More particularly, the objects of this invention are as set forth and as will be apparent from the description and drawings which are a part hereof:

To provide in a hand truck or the like, such as generally used for the transportation and handling of boxes, trunks, major appliances, and heavy items which it is desired to transport from place to place, up or down stairs, onto platforms, on and off delivery tracks, and for a multitude of uses for which such device as herein depicted and described is found useful, a means whereby the hand truck, herein referred to for convenient reference as a truck, can be extended or retracted to accommodate articles of various dimension as to length;

To provide a truck which for its weight can accommodate heavy loads and yet is easy to handle and transport;

To provide a truck, in a manner as hereinafter set forth, having removable and replaceable elements, whereby the truck can readily be converted from one type to another;

To provide a truck, in a manner as hereinafter set forth, in which a dolly and a toe plate may be interchanged;

To provide a truck, in a manner as hereinafter set forth, having both wheels and a Caterpillar type tread whereby the truck may readily be used either on a straightaway or on a stairway;

To provide a truck, in a manner as hereinafter set forth, in which the forward dolly is extensible and convertible into various lengths to support various weights and sizes of loads;

To provide a truck, in a manner as hereinafter set forth, in which all parts normally coming into contact either with a load being transported or with the operator are protected with a specially constructed rubber or like covering;

To provide a truck, in a manner as hereinafter set forth, in which the frame is of special construction to prevent binding of the extensible members when in course of being extended or inserted into each other;

To provide, in a manner as hereinafter set forth, a truck of the kind described, having cross members which may be readily removed or replaced, either for repair or replacement, or for purposes of making the entire truck a knockdown proposition for shipping purposes;

To provide, in a manner as hereinafter set forth, a truck of the class described, having novel means for securing load binding straps whereby said straps are protected from injury commonly experienced with old methods of securing the same;

To provide, in a manner as hereinafter set forth, a truck of the character described, having an offset handle whereby to protect the operator's hands and knuckles from injury in using said truck; and To provide, in a manner as hereinafter set forth, a truck of the sort described and depicted, wherein the hands of the operator are at all times protected from bare metal or like unpleasant contact in use of the truck during cold or otherwise inclement weather.

As hereinbefore stated, other objects will be readily apparent from the appended detailed description and drawings, wherein:

Figure 1 is a side elevational view of a truck embodying the invention.

Figure 2 is a front elevation, partly in section and partly cut away.

Figure 3 is a side elevational view, partly in section, taken on the vertical plane of line 3—3 of Figure 2.

Figure 4 is a detail cross-sectional view taken on the horizontal plane of line 4—4 of Figure 2, looking in the direction of the arrows.

Figure 5 is a detail cross-sectional view taken on the horizontal plane of line 5—5 of Figure 2, looking in the direction of the arrows.

Figure 6 is a fragmentary detail cross-sectional view taken on the vertical plane of line 6—6 of Figure 2, looking in the direction of the arrows.

Figure 7 is a fragmentary detail cross-sectional view illustrating details of the rear wheel assembly and taken on the line 7—7 of Figure 3, looking in the direction of the arrows.

Figure 8 is a detail cross-sectional view taken on the vertical plane of line 8—8 of Figure 2, looking in the direction of the arrows.

Figure 9 is a perspective view of a dolly attached to the hand truck in lieu of the toe plate.

Figure 10 is a detail longitudinal cross-sectional view taken on the vertical plane of line 10—10 of Figure 9, looking in the direction of the arrows.

Figure 11 is a modification illustrating the roller and belt assembly as an attachment unit for trucks of the type described.

Figure 12 is a fragmentary detail cross-sectional view taken on the horizontal plane of line 12—12 of Figure 11, looking in the direction of the arrows.

Figure 13 is a side elevational view of the strap handle bolt.

Figure 14 is a perspective view of the truck illustrated in Figure 1 illustrating the extensible frame in extended position and also illustrating diagrammatically the substitution of a dolly for the toe plate.

Figure 15 is a perspective view of the dolly illustrated in Figure 14.

Figure 16 is a fragmentary perspective view illustrating a modification of the front end of the truck.

Figures 17 and 18 are illustrative of the truck constructed in accordance with this invention and its usages.

Referring now more specifically to the drawings, reference numeral 20 designates, in general, a hand truck constructed in accordance with the teachings of this invention. As illustrated therein, the truck 20 is seen to comprise a pair of spaced longitudinally extending frame members 22 having a substantially hollow rectangular configuration including spaced outer and inner longitudinally extending side members 24 and 26, respectively, which are integrally connected at their respective adjacent opposed ends by a top and bottom wall 28 and 30, respectively.

The top wall 28 is integrally formed with a pair of longitudinally extending flanges 32 which project laterally away from the side walls 24, 26 and which terminate in inwardly curved sides 34. The bottom wall 30 is provided with a pair of integrally formed longitudinally extending flanges 36, 38 which project laterally from the side walls 24 and 26, respectively, see Figures 4 and 5 of the drawings. The flanges 36, 38 are provided in order to avoid the necessity of constructing right and left hand frame members 22.

The top wall 28, its flanges 32 and their inwardly curved sides 34 are covered with a strip 40 of resilient material such as rubber, the strip 40 having its longitudinal sides curved around the curved sides 34 and fixed in the channel 42 formed thereby.

The top, bottom and side walls are constructed with a plurality of longitudinally extending spaced and substantially parallel antifriction ribs 44 on their respective inner sides.

Referring to Figures 1, 3 and 4, the side frame members are maintained in laterally spaced and substantially parallel relation by means of a plurality of downwardly bowed, spaced and substantially parallel cross-braces 46. The braces 46 are substantially rectangular in configuration and comprise an elongated strip of metal 48 having longitudinally extending inwardly curved depending side flanges 50. A pad of resilient material 52 is secured to and covers the strip 48 and its flanges 50. The opposed ends of the strips 48 are fixedly secured to the confronting adjacent flanges 38 of the frame members 22 by bolts 54 and nuts 55.

Intermediate the centrally positioned cross-brace 46, at the uppermost one thereof, as viewed in Figure 2, a downwardly bowed spacer rod 56 is disposed having end lugs 58 fixedly secured to the confronting flanges 38 by bolts 60 and nuts 62. The rod 56 is encased in a sheath 64 of resilient material, such as rubber.

The side frame members 22 have their respective flanges 36, 38 cut away centrally thereof whereby one of the ends of the side walls 66, 68 of a substantially hollow rectangular casing 70 may fit flush against the side walls 24 and 26, respectively. The side walls 66, 68 diverge forwardly and downwardly away from the side walls 24, 26, and the lower ends thereof are integrally connected by a bottom wall 71 having a substantially rectangular slot 72 formed therein. A plurality of V-belt rollers 74 are mounted for rotation on axles 76 which are supported on the side walls 66, 68, the rollers 74 having portions thereof projecting through the slot 72 and over which is trained an endless V-belt 78.

A substantially rectangular housing 80 projects laterally away from the casing 70 towards the frame members 22, the housing including opposed front and rear end walls 82 and 84, respectively, a bottom wall 86, and opposed side walls 88, 90.

The housing 80 projects inwardly toward the side frame members 22 at the forward ends thereof and is fixedly secured thereto as by welding.

A transversely extending axle 91 extends through the side walls 88, 90 of each housing 80 and projects beyond the remote sides of the side walls 88, the projecting ends thereof having wheels 92 rotatably mounted thereon. The axle is encased in a resilient sheath 94 of rubber or other similar material and has secured thereto a plurality of axially spaced strap receiving rings 96.

A substantially L-shaped toe plate 98 extends transversely of the frame members 22 and has a pair of substantially rectangular housings 100 projecting laterally away from a side member 102 at each end thereof. The housing 100 includes a pair of oppositely disposed end walls 104, 106 integrally connected with a pair of side walls 108, only one of which is shown (see Figure 8). The housings 100 are adapted to telescope within the housing 80 and have the outer ends of their respective end members 104 and portions of their side members 108 cut away to permit the passage thereof to one side of the axle 91. The side 102 has a substantially rectangular rubber pad 110 fixedly secured thereto and is integrally formed with an end plate 112 which projects laterally therefrom at an angle of substantially 90°. The housings 80 and 100 are releasably secured together by cotter pins 114.

An extensible substantially rectangular frame member 116 is telescoped within each frame member 22, and includes top and bottom walls 118, 120 integrally connected by side walls 122, 124. The inner ends of the side walls 122, 124 of the extensible members 116 are provided with a plurality of aligned openings 126 which are adapted for selective alignment with similar openings 128 formed in the side walls 24, 26 of the side frame members 22. The aligned openings are adapted to receive the shank 130 of a strap bolt 132 (Figures 5 and 13). The outer end of the shank is externally threaded at 134 to receive the nut 136 thereon and its other end is rigidly secured to an endless strap loop 138 to receive the looped ends 140 of a strap 142 therethrough.

Each of the extensible members 116 have secured, as by welding, to their rear end portion an end frame member 144, identically constructed with respect to the side frame members 22, and the elements of the end frame member 144 finding their respective counter-parts in the side frame members 22 may be distinguished therefrom by the addition of a lower case letter "a."

The outer end of each rear end portion has fixedly secured thereto a side 146 of a polygonal handle 148.

A substantially U-shaped bracket 150 has the bight portion 152 pivotally secured to a block 153 rigidly secured to the bottom wall 30a, and the arms 154 thereof support an axle 156 on which is mounted a wheel 158. The bight 152 is swivelly secured to the block 153 on a pin 160.

A lever 162 has one of its ends pivotally connected on a bolt 164 to each of the side walls 26a, and each of the levers is provided with an offset portion 166 to accommodate the turning action of the bracket 150 and wheel 158, and the free ends of the levers 162 are connected with the opposite ends of a handle 168.

Figures 9, 10, 14 and 15 illustrate a modification of this invention wherein a dolly 170 is substituted for the toe plate 98.

The dolly 170 comprises a pair of substantially hollow elongated rectangular members 172 having longitudinally extending flanges 174, 176 extending laterally from each side thereof and integrally formed with their respective top walls 178. The top walls and flanges are encased within a resilient material such as rubber 180. The members 172 are held in laterally spaced relation by a rectangular cross-brace 182 which has its opposite ends fixedly secured to the flanges 176 and is encased by a resilient material such as rubber 184.

The members 172 receive one of the ends, respectively, of a pair of elongated substantially hollow rectangular elements 186 which are fixedly secured therein by a plurality of bolts 188. The elements 186 are provided with a plurality of apertures 190 and are adapted to be telescoped within a pair of centrally positioned, substantially hollow, elongated, rectangular casings 192 having its upper wall 193 provided with longitudinally extending flanges 194, 196 which project laterally beyond the side walls thereof. The upper wall 193 and flanges 194, 196 are encased by a resilient material such as rubber 198.

The casings 192 are provided with a plurality of longitudinally extending internally positioned antifriction ribs 200, and pins 202 extending through the side walls thereof, 204, 206, respectively, are adapted to enter selected openings 190 to hold the elements 186 in adjusted position relative to the casings 192 at one of the ends thereof.

One of the ends of a second pair of hollow rectangular elements 208 have one of their ends fixedly secured by bolts 210 within the other ends of the casings 192, with the other ends of the elements projecting longitudinally away therefrom.

The projecting ends of the elements 208 are apertured at 212 and are telescoped within one end of a pair of end members 214 constructed the same as the casings 192.

Pins 216 hold the elements 208 in selective adjusted relation relative to the end members 214.

Substantially hollow rectangular elements 218 similar to the elements 186 and 208 are telescoped within the other ends of the end members 214 and project therefrom. The elements 218 are secured in position by the bolts 220 and the side walls thereof are notched to form lips 221 adapted to engage under the axle 91.

The casings 192 and end members 214 are held in laterally spaced relation by cross-braces 222, 223 welded or otherwise secured to the flanges 196 and 224, respectively, and these braces are also covered with a resilient material such as rubber 226, 228.

A plurality of caster mounted wheels 230 depend from the cross-braces 182 and 223, while but a single centrally positioned similar wheel 232 depends from the cross-brace 222.

A pair of standards 234 have one of their ends pivotally mounted on the members 172 and the other ends thereof are connected by a handle 236.

Figures 9 and 10 illustrate the application of the three sectional dolly described above. However, the dolly may be shortened, if desired, by omitting the central portion thereof. In this case, as is illustrated in Figure 14, the rectangular elements 186 are inserted within and are adjusted relative to the end members 214.

Figure 16 is a fragmentary view of the truck shown in Figures 1, 2 and 3. This figure is identical with respect to the previous embodiment except for the addition of the transversely extending handle 238 having its opposite ends fixedly secured to one of the respective ends of a pair of levers 240, 242, the other ends of the levers being pivotally mounted by pins 244 on the confronting adjacent side walls 26.

Figures 11 and 12 illustrate a roller attachment for a hand truck having a truss similar to the casing 70 but without the roller and belt assembly heretofore described. In this embodiment, a substantially U-shaped channel member 246 having opposed spaced parallel side walls 248, 250 connected adjacent one of their respective ends by a bight 252 is connected to the side walls 66, 68 by a pair of longitudinally spaced bolts 254 and nuts 256. The side walls 248, 250 support a plurality of axles 258 on which are mounted a plurality of V-belt rollers 260 having portions thereof extending through a slot 262 formed in the bight 252. A V-belt 264 is trained about the rollers 260.

The versatility of a hand truck constructed in accordance with the teachings of this invention as set forth above is amply disclosed in the drawings. For example, Figures 1 and 2 illustrate the hand truck 20 collapsed to its smallest length and equipped with a toe plate 98. In this position the truck 20 is capable of handling trunks, refrigerators, small pieces of furniture and other similar articles normally transferred by the conventional trucks by a single operator. However, it should be noted that the Caterpillar track enables the operator to pull the truck upwardly of a stair flight without strain and without undue exertion, while at the same time preventing damage to the stair tread which normally occurs if the truck were merely equipped with the conventional wheels. Additionally, it should also be noted that in strapping objects on the truck, the strap 142 passes around the sides and front of the object and does not pass behind the truck frame or the object being handled. This eliminates obstruction in the event the object is being carried up stairs or across the tail board of a delivery truck.

Figure 3 illustrates the frame members of the hand truck partially extended in order to handle articles longer than could be treated with the truck in its collapsed position as is illustrated in Figures 1 and 2. Under some conditions the operator of the truck as illustrated in Figures 1, 2 and 3 may find that the truck cannot be conveniently operated through the use of the handles 148. In such cases the operator swings the handle 168 outwardly so that the levers 162 assume the position shown in dotted lines in Figure 3. Still further, if the hand truck 20 is more or less constantly used to handle heavy loads which should be lifted by two or more operators, the truck may be conveniently lifted by the addition of the handle 238 shown in Figure 16.

Lateral shifting of the load carried by the truck 20 is prevented by the use of the belt 142, and where necessary web belts may be snapped on the axle rings 96 and extended longitudinally of the frame members 22 to prevent longitudinal shifting of the load.

The utility of the dolly as is illustrated in Figures 14 and 15 is deemed obvious, but it is pointed out that the handle 236 facilitates the handling of the load.

The importance of the detachability of the dolly from the truck is clearly illustrated in Figure 17. As illustrated therein, the load 300 borne by the dolly may easily be maneuvered around sharp corners and into small cramped areas which conventional hand trucks cannot negotiate.

Figure 18 illustrates still another feature of this invention wherein the truck 20 has been extended to accept an elongated article such as a divan or sofa 400. The modified form of the dolly shown in Figure 14 is illustrated in Figure 18 and is employed as bracing means when the load is being lifted at an angle.

Having described and illustrated several embodiments of this invention, it is to be understood that the same are offered merely by way of example, and that this invention is to be limited only by the scope of the appended claims.

What is claimed is:

1. A hand truck comprising a substantially rectangular frame including a pair of spaced substantially parallel hollow rectangular side frame members having a pair of opposed top and bottom walls and a pair of opposed side walls, a longitudinally extending flange projecting laterally from each side wall of each of said frame members and aligned with said bottom wall, a longitudinally extending flange projecting laterally from each side wall of each of said frame members and aligned with said top wall, said last named flanges terminating in arcuately shaped sides, a sheet of resilient material engaging over said top wall and overlapping said arcuate portions of said last mentioned flanges, a plurality of substantially rectangular cross-braces extending transversely of said frame and having their opposed ends fixedly secured to a confronting pair of said first flanges, each of said cross-braces being bowed and having a strip of resilient material fixedly secured thereto, means supporting a wheel on one end of each of said side frame members, a substantially rectangular member telescoped within each of said side frame members, means cooperating with said side frame members and said telescoped rectangular members for holding said side frame members and said rectangular members in selected adjusted position, an end frame member fixedly secured to the outer end of said rectangular members, said end frame member having a pair of spaced parallel side frame members identical in cross-section to said first-named side frame members and connected by spaced parallel transverse cross braces having a cross-section identical to that of said first-named cross braces, a handle extending transversely of said end frame member and pivotally connected thereto, handle members fixedly secured to the outer end of said end frame member, and a transversely extending substantially L-shaped toe plate detachably secured to said one end of said side frame members.

2. A hand truck comprising a substantially rectangular frame including a pair of spaced substantially parallel hollow rectangular side frame members having a pair of opposed top and bottom walls and a pair of opposed side walls, a longitudinally extending flange projecting laterally from each side wall of each of said frame members and aligned with said bottom wall, a longitudinally extending flange projecting laterally from each side wall of each of said frame members and aligned with said top wall, said last named flanges terminating in arcuately shaped sides, a sheet of resilient material engaging over said top wall and overlapping said arcuate portions of said last mentioned flanges, a plurality of substantially rectangular cross-braces extending transversely of said frame and having their opposed ends fixedly secured to a confronting pair of said first flanges, each of said cross-braces being bowed and having a strip of resilient material fixedly secured thereto, means supporting a wheel on one end of each of said side frame members, a substantially rectangular member telescoped within each of said side frame members, means cooperating with said side frame members and said telescoped rectangular members for holding said side frame members and said rectangular members in selected adjusted position, an end frame member fixedly secured to the outer end of said rectangular members, said end frame member having a pair of spaced parallel side frame members identical in cross-section to said first-named side frame members and connected by spaced parallel transverse cross braces having a cross-section identical to that of said first-named cross braces, a handle extending transversely of said end frame member and pivotally connected thereto, handle members fixedly secured to the outer end of said end frame member, and a dolly detachably secured to said one end of said side frame members.

3. A hand truck as defined in claim 1, and said holding means comprising a pair of eye bolts extending transversely through said side frame members and said rectangular members with the eyes thereof positioned on remote sides of said side frame members, and a belt having the ends thereof looped through said eyes.

4. A hand truck as defined in claim 2, and said holding means comprising a pair of eye bolts extending transversely through said side frame members and said rectangular members with the eyes thereof positioned on remote sides of said side frame members, and a belt having the ends thereof looped through said eyes.

References Cited in the file of this patent

UNITED STATES PATENTS

| | | |
|---|---|---|
| 882,938 | Fleischmann | Mar. 24, 1908 |
| 887,821 | Lang | May 19, 1908 |
| 1,150,964 | Phelps | Aug. 24, 1915 |
| 1,716,611 | Wilson | June 11, 1929 |
| 2,301,341 | Stevens et al. | Nov. 10, 1942 |
| 2,459,275 | Gates | Jan. 18, 1949 |
| 2,519,113 | Cohn | Aug. 15, 1950 |
| 2,558,144 | McComie | June 26, 1951 |
| 2,683,610 | Brown | July 13, 1954 |